United States Patent [19]

Chen et al.

[11] Patent Number: 5,362,833
[45] Date of Patent: Nov. 8, 1994

[54] PHENOLIC POLYSILOXANE-CONTAINING COATED ARTICLES USEFUL AS TONER FUSING MEMBERS

[75] Inventors: Jiann H. Chen, Fairport; Tsang J. Chen; Lawrence P. DeMejo, both of Rochester, all of N.Y.

[73] Assignee: Eastman Kodak Company, Rochester, N.Y.

[21] Appl. No.: 896,768

[22] Filed: Jun. 10, 1992

[51] Int. Cl.$^5$ ............................................. C08G 77/04
[52] U.S. Cl. ..................................... 528/25; 428/447; 528/10
[58] Field of Search ...................... 528/10, 25; 428/447

[56] References Cited

U.S. PATENT DOCUMENTS

| | | | |
|---|---|---|---|
| 3,792,012 | 2/1974 | Zdaniewski | 523/213 |
| 4,130,599 | 12/1978 | Merrill et al. | 525/477 |
| 4,283,513 | 8/1981 | Mikami | 525/476 |
| 4,313,988 | 2/1982 | Koshar et al. | 428/40 |
| 4,952,657 | 8/1990 | Riding et al. | 528/27 |
| 4,970,098 | 11/1990 | Ayala-Esquilin et al. | 428/36.4 |
| 5,025,074 | 6/1991 | Davis et al. | 528/15 |
| 5,039,772 | 8/1991 | Davis et al. | 528/15 |
| 5,041,514 | 8/1991 | Webb et al. | 528/25 |
| 5,115,007 | 5/1992 | Chihara et al. | 524/267 |

OTHER PUBLICATIONS

Cyanamid Publication "Cymel 303 Crosslinking Agent".
Cyanamid Publication "High Solids Amino Crosslinking Agents".

*Primary Examiner*—John Kight, III
*Assistant Examiner*—T. Mosley
*Attorney, Agent, or Firm*—Anne B. Kiernan

[57] ABSTRACT

Toner fusing members coated with melamine-cured phenolic polysfloxanes compositions are obtained. Such a phenolic polysiloxane is obtained by hydride-addition of a hydride-substituted polysiloxane with an alkenyl substituted phenol.

16 Claims, No Drawings

PHENOLIC POLYSILOXANE-CONTAINING COATED ARTICLES USEFUL AS TONER FUSING MEMBERS

FIELD OF INVENTION

This invention relates to a polyamine-cured polysiloxane coating composition derived from novel phenolic polysiloxanes. The coating compositions are useful in the manufacture of toner fusing members.

BACKGROUND OF THE INVENTION

In certain electrostatographic imaging and recording processes, for instance, in electrophotographic copying processes, an electrostatic latent image formed on a photoconductive surface is developed with a developer which is a mixture of carrier particles, e.g., magnetic particles, and a thermoplastic toner powder which is thereafter fused to a receiver such as a sheet of paper. The fusing member can be a roll, belt or any surface having a suitable shape for fixing thermoplastic toner powder images to a substrate. The fusing step commonly consists of passing the substrate, such as a sheet of paper on which toner powder is distributed in an imagewise pattern, through the nip of a pair of rolls, at least one of which is heated. Where the fusing member is a belt it is preferably a flexible endless belt having a smooth, hardened outer surface which passes around a heated roller. A persistent problem in this operation is that when the toner is heated during contact with the heated roll or belt it may adhere not only to the paper but also to the fusing member. Any toner remaining adhered to the member can cause a false offset image to appear on the next sheet and can also degrade the fusing member. Another potential problem is thermal degradation of the member surface which results in an uneven surface and defective patterns in thermally fixed images.

Toner fusing rolls have a cylindrical core which may contain a heat source in its interior, and a resilient covering layer formed directly or indirectly on the surface of the core. Roll coverings are commonly fluorocarbon polymers or silicone polymers, such as poly(dimethylsiloxane) polymers, of low surface energy which minimizes adherence of toner to the roll. Frequently release oils composed of, for example, poly(dimethylsiloxanes), are also applied to the roll surface to prevent adherence of toner to the roll. Such release oils may interact with the roll surface upon repeated use and in time cause swelling, softening and degradation of the roll. Silicone rubber covering layers which are insufficiently resistant to release oils and cleaning solvents are also susceptible to delamination of the roll cover after repeated heating and cooling cycles.

Toner fusing belts are composed of a continuous flexible material having superior resistance to heat and a smooth surface. The belt substrate can be metallic or polymeric. The surface of the belt is composed of a thinly coated, low surface energy polymer such as a fluorocarbon or a silicone resin.

Techniques for coating fusing members, such as ring coating and dip coating, require compositions that form stable coats on drying. Coatings which tend to flow or sag can form an uneven surface on curing, with adverse results on image transfer.

There is a need for coating compositions which do not flow or sag on drying and which adhere strongly to both rolls and belts. The surface should be hard and tough, and resistant to wear, cracking, cleaning solvents and releasing fluids.

SUMMARY OF THE INVENTION

The present invention relates to phenolic polysiloxanes and cured coating compositions containing them which are useful as covering layers for fusing members. Such fusing members have increased resistance to solvents, image offset, abrasion, oil swelling and delamination.

The phenolic polysiloxane of the invention is of the formula,

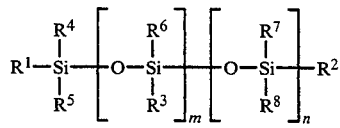

wherein, $R^1$, $R^2$ and $R^3$ are independently $C_1$–$C_6$ alkyl, phenyl or a HO-Ar-alk-group, provided that said polysiloxane has at least two HO-Ar-alk-groups;

$R^4$–$R^8$ are independently $C_1$–$C_6$ alkyl or phenyl;

Ar is phenylene, naphthylene or phenylene substituted with $C_1$–$C_6$ alkyl or $C_1$–$C_3$ alkoxy;

alk is $C_2$–$C_6$ alkylene;

m is 0 to 1,000; and n is 5 to 10,000.

The coated article of the invention, such as a fusing belt, comprises a substrate and coated thereon a composition comprising a crosslinked product of a phenolic polysiloxane, as described above, and a polyamine crosslinking agent. In addition the coating composition can include a hydroxyl functional silicone resin which also undergoes crosslinking with the polyamine.

DETAILED DESCRIPTION OF THE INVENTION

The phenolic polysiloxanes of the invention are readily prepared by hydride addition of a hydride-substituted organopolysiloxane polymer to a monohydric phenol substituted with alkenyl groups. The hydride-substituted organopolysiloxane can be hydride terminated or contain internal hydride groups.

Preferably, the hydride-substituted organopolysiloxane has the formula,

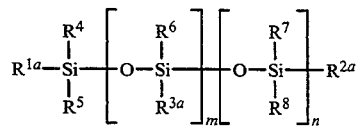

wherein, $R^{1a}$, $R^{2a}$ and $R^{3a}$ are independently hydrogen, $C_1$–$C_6$ alkyl or phenyl, provided that said organopolysiloxane has at least two hydrogens;

$R^4$–$R^8$ are independently $C_1$–$C_6$ alkyl or phenyl;

m is 1 to 1,000; and n is 5 to 10,000.

The hydride substituted organopolysiloxane polymers can be prepared by the copolymerization of the appropriate monomers using known polymerization catalysts as described, for example in Gilbert and Kantor, "Transient Catalysts for the Polymerization of Organosiloxanes," *J. Poly. Sci.* Vol. XL, pp. 35–58 (1959). which is hereby incorporated by reference.

Suitable monomers for the hydride-substituted organopolysiloxane polymers include any monomer which yields the desired substituted organosiloxane repeating units. These polymers should contain at least two hydride groups which are available for addition to the unsaturated functions of the other elastomer reactants. Particularly suitable monomers yield dimethylsiloxane or diphenyl-siloxane repeating units. These include both linear and cyclic monomers containing dimethylsiloxane or diphenylsiloxane groups. A preferred monomer for providing for providing the diphenylsiloxane units is octaphenylcylotetrasiloxane. Suitable monomers for providing the hydride units include dhnethylsilyl chloride. pentamethyldisiloxane, heptamethyltrisiloxane, 1,1,1,2,3,4,4,4-octamethyltetrasiloxane, hexamethylcylotetrasiloxane and mixtures of methylhydrocyclosiloxanes. Other monomer organosiloxane units (e.g., diethylsiloxane and other endcapping moieties such as those formed from hexamethyldisiloxane, decamethyl-tetrasiloxane, 1,3-diphenyltetramethyldisiloxane, and 1,1,5,5-tetraphenyl- 1,3,3,5-tetramethyltrisiloxane) may be added in appropriate amounts.

The monohydric phenols, useful in the practice of this invention are monosubstituted with alkenyl radicals and have the corresponding formula.

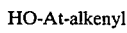

HO-At-alkenyl wherein,

Ar is a phenylene, naphthylene or phenylene substituted with $C_1$-$C_6$ alkyl or $C_1$-$C_3$ alkoxy; and alkenyl is $C_2$-$C_6$ alkenyl.

The monohydric phenols are either commercially available or can be prepared by methods well known in the prior art. Exemplary phenols include, for example, 4-hydroxystyrene, 2-allylphenol, 4-allylphenol, 2-methyl-6-allylphenol and 2-methoxy-4-allylphenol.

To prepare the phenolic polysilxanes the hydride-substituted organopolysiloxane and the alkenyl-substituted phenol are mixed with a suitable inert solvent, for example, toluene, tetrahydrofuran or dimethylformamide. Where the reactants are liquid, a solvent is not necessary. Hydride addition is promoted by a suitable catalyst such as Group VIII metals or derivatives thereof. Examples of such catalysts in a metallic state are platinum, ruthenium, rhodium, palladium and iridium. Especially useful are compounds or complexes of platinum such as $H_2PtCl_6$ and platinum divinyltetramethyldisiloxane complex. Such catalysts are preferably used in amounts of from 0.5 to 500 ppm (parts per million, by weight) calculated as the metallic element and based on the weight of reactants. The hydride-addition reaction is carried out a temperature of, for example, from 15° C. to 100° C., preferably 15° C. to 60° C. It is usually desirable to maintain the mixture at the desired temperature range for a period of from 1 to 48 hours. The polymeric diols are isolated by drying to remove the solvent. Alternatively, more than one equivalent amount of alkenyl-substituted phenol compound may be added to the solution, and the excess phenol compound is removed by vacuum distillation, or by pouring the final mixture into a non-solvent medium for the addition product, such as methanol. It is, however, most desirable to use a stoichiometric amount or slightly less, of alkenyl-substituted phenol compound, so that no stripping or precipitation process is required to recover the final products.

In the phenolic polysiloxanes of the invention:

Lower alkyl groups which $R^1$-$R^8$ represent include methyl, ethyl, propyl, isopropyl, butyl, sec.butyl, pentyl and hexyl, preferably methyl.

$C_2$-$C_6$ alkylene groups include ethylene, propylene, butylene, pentylene and hexylene, preferably propylene.

Preferred phenolic polysiloxanes are those in which $R^1$, $R^2$ and $R^3$ are independently methyl or 3-(2-hydroxyphenyl)propyl groups; more preferred are those in which $R^1$, $R^2$ and $R^4$-$R^8$ are methyl, $R^3$ is 3-(2-hydroxyphenyl)propyl and the ratio of m to n is about 3 to 7.

The phenolic polysiloxane polymers described above are soluble in polar organic solvents, for example, chlorinated solvents such as methylene chloride, and tetrahydrofuran. They are therefore suitable for solution coating processes, especially when mixed with a crosslinking agent and subjected to curing conditions on a coated article. These phenolic polysiloxanes contain reactive hydroxyl sites suitable for condensation with crosslinking agents.

Crosslinking agents which are useful in the preparation of surface coatings are the polyamine crosslinking agents, such as phenylenediamines, oxydianilines, methylenedianilines, diethylenetriamine, triethylenetetramine, 1 -( 2-aminoethyl)piperazine, diaminodiphenyl sulfone, bis(aminocyclonexyl)methane and the like, provided sufficient phenol groups are present for adequate crosslinking. Especially useful polyamine crosslinking agents are the amino resins and polyfunctional aziridines. The term "amino resins" is normally applied to the condensation products of formaldehyde and polyfunctional amides and amidines such as urea and melamine. The phenolic polysiloxanes described above, when cured with polyamine crosslinking agents provide coating compositions with properties suitable for use in fusing members.

Melamine resins, such as Cymel-303, which is hexamethoxymethylmelamine, -380, and -385, which are methoxymethylmethylolmelamines, from American Cyanamid, are used as crosslinking agents, generally constituting from 2 to 80 wt. %, preferably 10 to 40 wt. % of the final coating compositions.

The commercially available melamine resins differ principally in the number of methoxymethyl and hydroxymethyl substituents on the melamine amino groups and the degree of polymerization of the resins. The methoxymethyl and hydroxymethyl groups are both capable of acid catalyzed crosslinking with suitable nucleophiles, such as the hydroxyl groups of the phenolic polysiloxanes of the invention. Cymel-303 melamine resin, with a degree of polymerization of about 1.7, is composed predominantly of monomeric hexamethoxymethyl melamine and crosslinks with hydroxyl groups in the presence of a strong acid catalyst. Cymel-380 melamine resin, with a degree of polymerization of about 2.6 contains both hydroxymethyl and methoxymethyl groups and a significant level of polymeric forms, reacts readily with hydroxyl groups in the presence of weak acid catalysts. Cymel-385 melamine resin, with a degree of polymerization of about 2.1, and a high proportion of hydroxymethyl groups is a very reactive curing agent under mild acid conditions. By degree of polymerization is meant, the average number of triazine units per molecule.

Additional suitable crosslinking agents include the polyfunctional aziridines, such as trimethylolpropane tris[beta-(N-aziridinyl)propionate] and pentaerythritol tris[beta-(N-aziridinyl)propionate], which impart flexibility, increased hardness and improved solvent resistance to the cured polymers. These are tertiary polyamines.

In accordance with the present invention, the coated article can be a fusing member in the form of a roll, belt or any surface having a suitable configuration for fixing or fusing a thermoplastic toner image to a substrate such as a paper sheet.

When the fusing member is in the form of a belt which passes around a heated resilient or hard roller the belt comprises a substrate having a thin, hard outer coating. The backup pressure roller has an overcoat which is sufficiently compliant that, in combination with the coated belt, a compliant surface is presented to an image carrying receiver sheet.

A coated fusing belt of the invention comprises a continuous flexible substrate having a surface covering of, for example, a melamine-cured phenolic polysiloxane of the invention. The coated fusing belt is fabricated by first preparing a solution to be used to form the coating. The solution comprises a solvent, for example, tetrahydrofuran, the phenolic polysiloxane of choice, a melamine resin and a catalyst useful for crosslinking of the hydroxy groups of the phenolic polysiloxane with the melamine resin's reactive groups. The solution contains, for example, 10-30 weight percent of the phenolic polysiloxane and 2-10 weight percent of the melamine resin. The coating solution is applied to the belt substrate by well known techniques such as blade application, ring, web or dip coating to give a 2-20 micrometer thick layer. Curing is accomplished in about 30 min. to 3 hrs., at temperatures from about 100° to 250° C., using an acid catalyst, such as p-toluenesulfonic acid or trifluoroacetic acid, at about 0.001% to 3.0% with respect to total solids in the formulations. In a preferred embodiment curing is accomplished by heating at about 130°-160° C. for two hours.

In another embodiment of the invention the coating composition further comprises a hydroxyl functional hard silicone copolymer resin comprising difunctional and trifunctional siloxane repeating units of the formulae, $(R^9)_2SiO$ and $R^{10}SiO_{1.5}$ respectively.

wherein,
R$^9$ and R 10 are independently methyl or phenyl, provided that the ratio of methyl to phenyl groups is between 0.2 and 2 to 1.

Such hard silicone resins, when blended with coating compositions, provide good stability against flow or sag on drying, and impart thermal stability and hardness to the cured coat. The hard silicone resin self-cures on heating, however, the hydroxyl functional groups can also crosslink with the polyfunctional amine curing agents. The level of hardness of the silicone resin varies with the degree of functionality of the siloxane units and with the ratio of methyl to phenyl groups. Preferably the ratio of difunctional siloxane units to trifunctional units is between about 0.1 and 1 to 1, and preferably the ratio of methyl to phenyl groups is between about 0.2 and 2 to 1, more preferably between about 0.5 and 1.5 to 1.

Hard silicone resins are either commercially available or can be prepared by methods well known in the prior art. Suitable commercially available silicone resins are sold, for example, by Dow Corning Corp. and include those sold as solvent solutions, for example DC-804, DC-806A and DC-840, and as solids, for example DC-Z-6018 and DC-6-2230. A particularly useful resin is DC-6-2230, a dimethyldiphenylsiloxane copolymer containing methyl to phenyl groups in a ratio of about 1 to 1, difunctional to trifunctional siloxane units in a ratio of about 0.1 to 1 and having a number-average molecular weight (Mn) between 2,000 and 4.000.

Even without the additional hard silicone resins, the phenolic polysiloxanes produce dry, stable coatings before curing. However, coating compositions can contain, for example, about 5 to 200 parts, preferably 10 to 100 parts of a hard silicone resin, based on 100 parts of the phenolic polysiloxane so that the final coating composition contains about 5 to 70 weight percent of the hard silicone resin.

The melamine-cured, thermoset resins of the invention provide hard, tough, low surface energy coatings for such fusing members and have the advantages of excellent thermal stability, good releasing properties, resistance to cleaning solvents and swelling by release oils, and resistance to abrasion and delamination. Fusing members of the invention thus have a thin, hardened surface which resists wear and cracking and resists the tendency of toner to become embedded on the surface. Their superior resistance to cleaning solvents and to swelling by release oils results in a reduction or elimination of step patterns in electrophotographic copies.

The phenolic polysiloxane described above and the coating compositions of the invention having the properties described above can also be advantageously used as low surface energy addenda for toners and toner carrier particles.

Cured coatings of the invention, on stainless steel shims or copper foils at dry thickness of about 0.5 micrometer to 50 micrometer, have exhibited good adhesion to the substrates with excellent resistance against common organic solvents, such as acetone and toluene. In addition, when evaluated as image-fixing media, the coatings have shown desirable release properties with minimal or no offsettings under simulated fusing conditions, as indicated in examples hereinafter.

EXAMPLES

The following examples illustrate the preparation, formulation, coating, curing, and subsequent testing of the phenolic polysiloxane compositions.

Preparation of Phenol-Terminated Polydimethylsiloxanes

Example 1

Toluene (10 g), 2-allylphenol (2.68 g) and PS-542 (17.5 g; a hydride terminated polydimethylsiloxane (PDMS) of Mn=17,500 from Hüls America Inc.) were mixed and stirred at ambient temperature to form a clear solution. A platinum catalyst (0.2 g; prepared by diluting 3 parts of PC 075, a platinum divinyltetramethylsiloxane sold by Hüls America Inc., with 7 parts of toluene) was then added and stirring was maintained at ambient temperature for 24 hours. The product was washed with 100 ml portions of methanol twice to remove unreacted phenol and dried to give the phenolic polysiloxane (17 g).

Example 2

By following essentially the same procedure as described in Example 1 and substituting PS-542 with PS-537 (a hydride-terminated polydimethylsiloxane, Mn=400, sold by Hüls America Inc.) a phenol-terminated polydhnethylsiloxane was obtained. Thus PS 537 (100 g), toluene (50 g), 2-allylphenol (67 g) and PC 075 (0.5 g) were mixed and stirred so that the reaction temperature remained below 60° C. The toluene was removed on a rotary evaporator at 60° C.

Preparation of Phenol-Substituted Polydimethylsiloxanes

Example 3

By following essentially the same procedure as described for Example 1 and substituting PS 542 with PS 124.5 (a copolymer of methylhydro/dimethyl polysiloxane containing about 4 mole percent methylhydro units, of Mn=13,300, sold by Hüls America Inc.) an internally substituted product is obtained. Thus PS 124.5 (22 g), 2-allylphenol (8.05 g) and toluene (10 g) were mixed with 0.2 g of the platinum catalyst described in Example 1 and stirred at ambient temperature for 48 hours. The reaction mixture was then extracted with 150 ml portions of methanol twice and dried to give the product (23.8 g).

Example 4

2-allylphenol (60 g), toluene (50 g) and PS 123 (100 g; a methylhydro/dimethyl polysiloxane, containing about 30 mole present methylhydro units, of Mn=2,000, sold by Hüls America Inc.) were mixed and stirred with PC 075 (0.48 g) for 3 hours. The toluene was removed in a rotary evaporator at 55° C. to give the phenolic polydimethylsiloxane in quantitative yield.

Coating, Curing and Testing of the Phenolic Polysiloxanes

Example 5

2 The phenolic polydimethylsiloxane (PDMS) obtained in Example 4, Cymel-380 melamine resin and trifluoroacetic acid with and without the silicone resin DC-6-2330 (sold by Dow-Corning Corp.) were dissolved in a solvent and coated on a 2 mil (approximately 50 micrometer) stainless steel shim and dried at 55°–60° C. The coated shim was then heat-cured in an oven. The concentrations of the reactants and curing conditions are described in Table I.

TABLE I

| Sample ID | PDMS (g) | Melamine Resin (g) | Silicone Resin (g) | $CF_3COOH$ (g) | Solvent (g) | Curing (2 hrs) T°C. |
|---|---|---|---|---|---|---|
| S-1 | 24 | 6 | — | 0.7 | 120 Toluene | 140 |
| S-2 | 14.4 | 3.6 | 7.2 | 0.42 | 72 MEK* | 160 |
| S-3 | 14.4 | 3.6 | 7.2 | 0.42 | 100 THF* | 175 |
| S-4 | 28.8 | 7.2 | 14.4 | 0.84 | 50 THF* | 175 |

*MEK is methyl ethyl ketone; THF is tetrahydrofuran.

A coated test strip was mounted on a test roller to evaluate the release properties under simulated fusing conditions. A branched polyester color image on laser print paper released from the Example 5 coatings with a minimal offset, while an uncoated stainless strip failed to release, under the following fusing conditions:

Fusing Temperature: 265° F. (approx. 130° C.)
Release Temperature: 120° F. (approx. 49° C.)
Speed: one inch (approx. 2.54 cm) per sec.
Pressure: 0.5 psig (approx. 351 Kg/m²)
Nip Width: 100 mils (approx. 2,500 micrometer)
Pressure Roller: 20 mil (approx. 500 micrometer) Fluorinated Ethylenepropylene (FEP supplied by Dupont) over 20 mil (approx. 500 micrometer) Silicone Elastomer (Silastic J supplied by Dow Corning Corp.).

Test of Coating Life On A Fusing Belt

Toner fusing belts were coated with Sample (S-2) at a 2 micrometer and a 15 micrometer thickness and tested under simulated copying conditions as follows:
Fusing Temperature: 260° F. (approx. 126° C.)
Release Temperature: 115° F. (approx. 46° C.)
Nip Width: 200 mils (5 mm approx.)
Nip Time: 130 msec.
Speed: 2.5 inches per sec. (approx. 6.4 cm/sec. )
Pressure Roll: 0.001" (approx. 25 micrometer) of Silastic E over 0.150" (approx. 3.8 mm) of Silastic J. [Silastic E and J are silicone elastomers supplied by Dow Corning Corp.]
Toner: Cyan branched amorphous polyester
Paper: Bond The 2 micrometer thick coating had a lifetime of 1940 copies.

The 15 micrometer thick coating had a lifetime of 2314 copies.

Although the invention has been described in detail with particular reference to certain preferred embodiments thereof, it should be appreciated that variations and modifications can be effected within the spirit and scope of the invention.

What is claimed is:

1. A coated article comprising:
   a substrate, and coated thereon a composition comprising a crosslinked product of,
   a phenolic polysiloxane of the formula

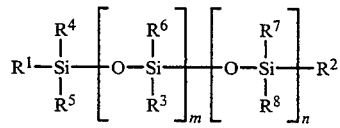

wherein, $R^1$, $R^2$ and $R^3$ are independently $C_1$–$C_6$ alkyl, phenyl or a HO-Ar-alk-group, provided that said polysiloxane has at least two HO-Ar-alk-groups;

$R^4$–$R^8$ are independently $C_1$–$C_6$ alkyl or phenyl;

Ar is phenylene, naphthylene or phenylene substituted with $C_1$–$C_6$ alkyl or $C_1$–$C_3$ alkoxy;

alk is $C_2$–$C_6$ alkylene;

m is 1 to 1,000;

n is 5 to 10,000;

a polyamine crosslinking agent; and a hard silicone polymer resin comprising repeating units of the formulae,

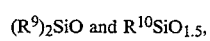

wherein, $R^9$ and $R^{10}$ are independently methyl or phenyl, provided that the ratio of methyl to phenyl groups is between about 0.2 and 2 to 1.

2. A coated article according to claim 1, wherein said article is a fuser belt comprising a continuous flexible substrate.

3. A coated article according to claim 1, wherein said composition contains from 10–50 weight percent of said polyamine.

4. A coated article according to claim 1, wherein said polyamine is a melamine resin.

5. A coated article according to claim 4, wherein said melamine resin is selected from the group consisting of hexamethoxymethylmelamine and methoxymethylmethylolmelamine.

6. A coated article comprising:
a substrate, and coated thereon a thermoset resin composition comprising a crosslinked product of,
a phenolic polysiloxane of the formula,

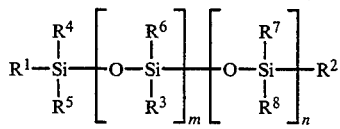

wherein, $R^1$, $R^2$ and $R^3$ are independently $C_1$–$C_6$ alkyl, phenyl or HO-Ar-alk group, provided that said polysiloxane has at least two HO-Ar-alk groups;

$R^4$–$R^8$ are independently $C_1$–$C_6$ alkyl or phenyl;

Ar is phenylene, naphthylene or phenylene substituted with $C_1$–$C_6$ alkyl or $C_1$–$C_3$ alkoxy;

alk is $C_2$–$C_6$ alkylene;

m is 1 to 1,000;

n is 5 to 10,000; and polyfunctional aziridine crosslinking agent.

7. A coated article according to claim 6, wherein said polyfunctional aziridine crosslinking agent is selected from the group consisting of trimethylolpropane tris[beta-(N-aziridinyl)propionate] and petaerythritol tris[beta-(N-aziridinyl)propionate].

8. A coated article according to claim 6, further comprising a hard silicone copolymer resin comprising repeating units of the formulae,

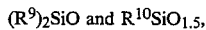

wherein, $R^9$ and $R^{10}$ are independently methyl or phenyl, provided that the ratio of methyl to phenyl groups is between about 0.2 and 2 to 1.

9. A coated article according to claim 6, wherein said article is a fuser belt comprising a continuous flexible substrate.

10. A coated article according to claim 6, wherein said thermoset resin composition contains from 10–50 weight percent of said polyfunctional aziridine crosslinking agent.

11. A coated article comprising:
a substrate, and coated thereon a thermoset resin composition comprising a crosslinked product of,
a phenolic polysiloxane of the formula,

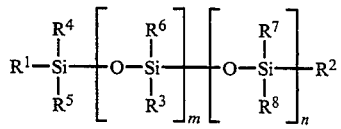

wherein, $R^1$, $R^2$ and $R^3$ are independently $C_1$–$C_6$ alkyl, phenyl or HO-Ar-alk group, provided that said polysiloxane has at least two HO-Ar-alk groups;

$R^4$–$R^8$ are independently $C_1$–$C_6$ alkyl or phenyl;

Ar is phonylena, naphthylene or phenyiene substituted with $C_1$–$C_6$ alkyl or $C_1$–$C_3$ alkoxy;

alk is $C_2$–$C_6$ alkylene;

m is 1 to 1,000;

n is 5 to 10,000; and tertiary polyamine crosslinking agent.

12. A coated article according to claim 11, further comprising a hard silicone copolymer resin comprising repeating units of the formulae,

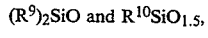

wherein, $R^9$ and $R^{10}$ are independently methyl or phenyl, provided that the ratio of methyl to phenyl groups is between about 0.2 and 2 to 1.

13. A coated article according to claim 11, wherein said article is a fuser belt comprising a continuous flexible substrate.

14. A coated article according to claim 11, wherein said thermoset resin composition contains from 10–50 weight percent of said tertiary polyamine crosslinking agent.

15. A coated article according to claim 11, wherein said tertiary polyamine crosslinking agent is a melamine resin.

16. A coated article according to claim 11, wherein said melamine resin is selected from the group consisting of hexamethoxymethylmelamine and methoxymethylmethylolmelamine.

* * * * *